2,065,661

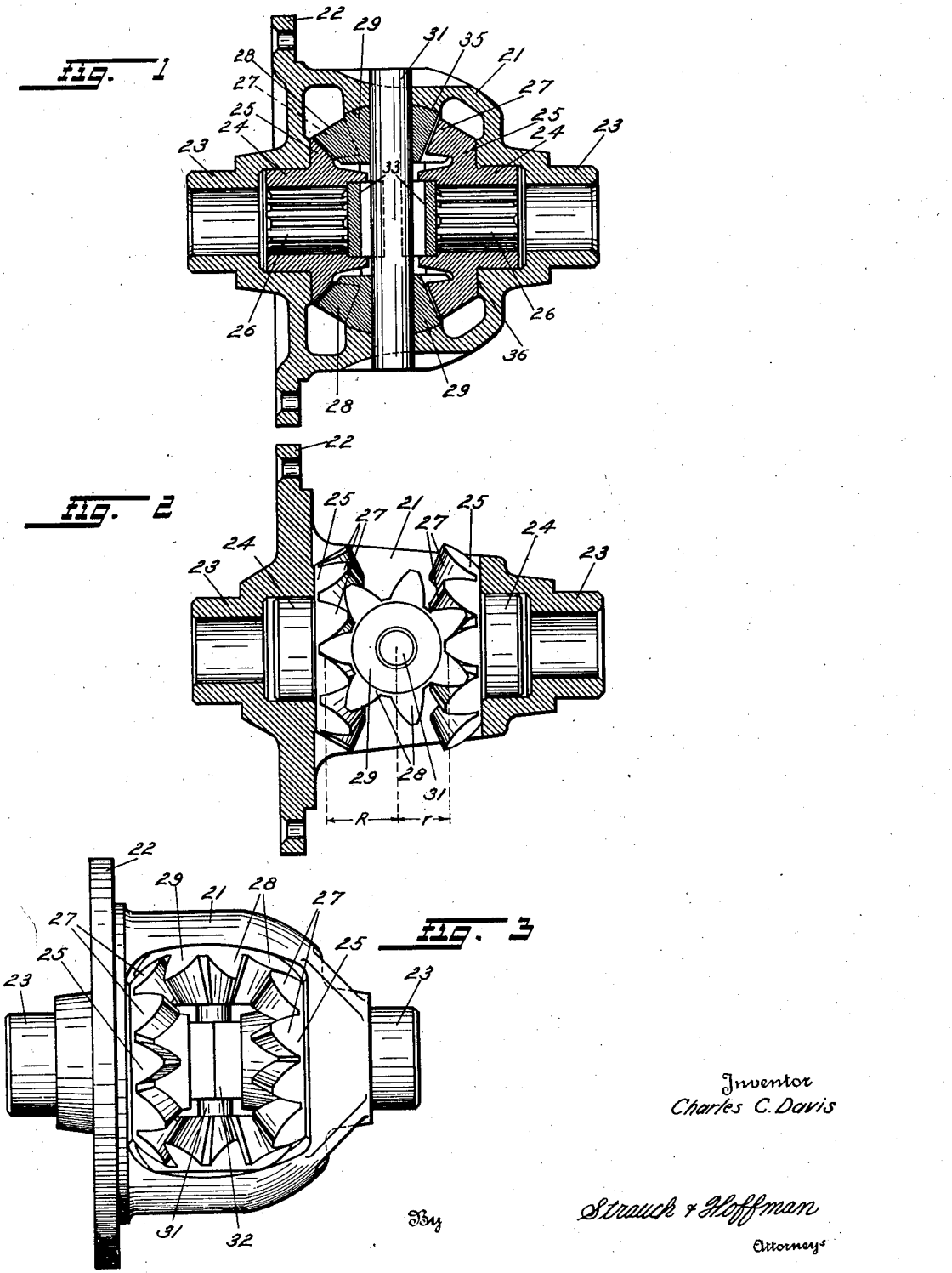
Dec. 29, 1936.   C. C. DAVIS   2,065,661
BEVEL GEAR DIFFERENTIAL MECHANISM
Original Filed Aug. 25, 1931
Inventor
Charles C. Davis
By Strauch & Hoffman
Attorneys Patented Dec. 29, 1936

UNITED STATES PATENT OFFICE 2,065,661

BEVEL GEAR DIFFERENTIAL MECHANISM

Charles C. Davis, Detroit, Mich., assignor to The Timken-Detroit Axle Company, Detroit, Mich., a corporation of Ohio Original application August 25, 1931, Serial No. 559,273. Divided and this application October 26, 1934, Serial No. 750,189

3 Claims. (Cl. 74—315)

The present invention relates to improvements in differential bevel gearing, and more particularly to improvements in differential bevel gearing of the type in which a periodic variation in leverage or torque ratio occurs between mating gears.

This invention is especially beneficial in motor vehicles in preventing complete loss of traction when one of a set of differentially driven wheels slips in a single axle or a compensated or differentiated dual axle drive, thereby increasing the tire life and safety of vehicles equipped therewith materially. In addition skidding and side slip tendencies due to sudden engagement of a vehicle clutch and due to uneven application of brakes is minimized, making the invention highly desirable in all classes of motor vehicles.

In variable leverage gearing of the present invention, as the mating gears rotate, the point of driving contact of the teeth in mesh with each other varies along a substantial arc of action between inner and outer pitch circles and this variation of the point of contact produces periodic variations in leverage or torque transmitted, the range of which for any given set of gears is determined by the tooth shapes and gear proportions.

I have discovered that by utilizing tooth forms for variable leverage spur and bevel gearing having curves of action formed of circular arcs between their inner and outer pitch circles having radii equal to the main pitch radii for mating spur gears, and equal to the main back cone pitch radii for mating bevel gears, it is possible to provide such gearing in which a maximum leverage variation is secured, tooth interference is eliminated, and uniform back lash is secured. Very small variations from these radii in the curves of action will in practice cause tooth interference and material back lash variations. The development of such tooth forms is outlined in application Ser. No. 559,273, filed August 25, 1931, of which the present case is a division.

When the tooth form of said application is applied to a differential mechanism, it has been found that highly improved results are secured if such form is applied to a conventional bevel gear differential and the bevel pinions are disposed between the side bevel gears so that a maximum leverage is applied to one side gear at the instant that the minimum leverage is applied to the opposite side gear. A preferred mode of accomplishing this result is to use a number of teeth which is divisible by the number of meshing pinions used, in the differential side gears, and an odd number in the meshing bevel pinions.

Accordingly, the principal object of the present invention is to provide a novel bevel gear type of differential mechanism embodying variable leverage gearing in which, when the axle shafts or the members are rotating at different speeds, the power applied to the several shafts varies periodically and alternately between limits amply sufficient to prevent the complete loss of traction that occurs with the conventional differential mechanisms when one of the wheels loses its traction. In this way, the skidding tendencies are minimized when the clutch is engaged suddenly in a motor vehicle embodying the invention on a slippery road, or when uneven application of the brakes occurs.

Further objects of the present invention will appear from the following detailed description of a preferred embodiment thereof and are such as may be obtained by utilization of the various combinations, subcombinations, steps and principles hereinafter set forth, and defined by the scope of the appended claims.

Referring to the drawing:

Figure 1 is a sectional view showing a bevel gear differential mechanism embodying the present invention gearing.

Figure 2 is a view partly in section looking at the back of a bevel pinion in the differential mechanism shown in Figure 1.

Figure 3 is a side view of the differential mechanism shown in Figure 1 illustrating the meshing relationship of the variable leverage bevel pinions and gears essential to secure the benefits above set forth, of my invention.

Like reference characters indicate like parts throughout the several figures.

This mechanism of the present invention comprises a differential housing 21 provided with a flange 22 to which the usual ring gear (not shown) for driving the differential mechanism is secured. Housing 21 is provided with tubular bearing extensions 23 by means of which it is journaled in well known manner in the differential carrier of an automotive axle.

Journaled for rotation in suitable bores formed in housing 21 are hubs 24 of differential side gears 25 provided with splined bores 26, into which the splined ends of the usual axle shafts (not shown) slidably fit in well known manner.

Gears 25 are each provided with improved variable leverage teeth 27 formed as described in application Ser. No. 559,273 above referred to. Said teeth mesh with the similarly formed variable leverage pinion teeth 28 of diametrically opposite pinions 29. When teeth 27 and 28 of gears 25 and pinions 29 are generated in the manner set forth in detail in said application backlash is uniform in all meshing positions thereof. Such teeth have profiles of arcuate form, the radius of the arc of the profile corresponding to the radius of the back cone circles of the gears and pinions. Gears 25 are provided with a number of teeth that is divisible by the number of pinions. And an odd number of teeth are provided in meshing pinions 29. With such arrangement the teeth on opposite sides of the pinions engage with the side gears in such manner that, when the lever arm between each pinion and one side gear is maximum, the lever arm between each pinion and the opposite side gear is a minimum. In the illustrated embodiment of the invention, at the position of the side gears and pinions illustrated in Figure 2, the power is applied to the left-hand side gear through lever R while at the same time it is applied to the right-hand through shorter lever r, resulting in a momentary transmission of a major part of the power to the left-hand axle section. When the gears have rolled a distance of one-half the circular pitch, the major portion of the power is applied to the right-hand axle section, and when a further distance of one-half the circular pitch is traversed, the major portion is again applied to the left-hand side gear and axle section.

It will also be noted that, since an even number of teeth is provided in the side gears, the meshing engagement and leverage ratios of diametrically opposite pinions 29 with relation to the side gears, due to the use of two-pinion gears, will at all times be the same. Leverage variation between pinions 29 and the side gears will thus occur simultaneously and in phase and unison, and the variations of leverage ratio will alternate between the pinions and the opposite side gears of the mechanism.

The maintenance of an odd number of teeth on the pinions and an even number of teeth on the side gears is highly important in applying my invention to bevel gear differential mechanisms. In the embodiment shown, the pinions 29 are provided with seven teeth, as shown, and the side gears with twelve teeth. Other combinations complying with the above may be employed.

Pinions 29 are journaled for rotation diametrically opposite each other on shaft or spindle 31, the ends of which are supported in suitable bores formed in the differential housing 21. Side gear spacing members 32 are disposed centrally around shaft 31 and are provided with cylindrical extensions which fit rotatably into bores 33 of the side gears 25. Hardened complemental bearing surfaces 35 and 36 are provided on the pinions and side gears, to withstand the end thrust developed on the pinions and gears in operation of the mechanism.

The differential mechanism so far described is mounted on a suitable carrier and supported in the housing (not shown) of a differential axle in well known manner. During normal operation of the axle when the traction of the driven wheels of the vehicle is equal, pinions 29 will rotate with the housing without rotating about shaft 31, driving side gears 25 and the axle shafts at equal speeds in a manner well understood in the art. When the vehicle turns a curve, the usual compensation in rate of rotation of the axle shafts will occur freely in the usual manner, with the pinions rotating slowly on shaft 31 in a manner characteristic of ordinary bevel gear differentials. When, however, one of the wheels of the vehicle turns ahead of the other rapidly, as occurs when the traction of one wheel is lost due to engagement with a slippery spot on the ground, relative rotation of the pinions 29 and gears 25 will occur, causing alternate leverage or torque variations and corresponding variations in the total power applied to the opposite axle shafts. As the leverage ratio on the gripping wheel increases, an increasing amount of power from the engine will be applied thereto. As a result a sufficient amount of power is in practice applied to the gripping wheel to drive the vehicle. The complete loss of traction that occurs with the ordinary differential mechanism when one wheel of a differentially driven pair loses its traction is completely eliminated by use of my invention. Also when a sudden unequal application of the brakes to the wheels of a vehicle embodying my invention occurs, such application tending to throw the vehicle into a skid, the variable leverage gearing will resist the tendency of the unbraked wheel to turn faster than the braked wheel, thereby minimizing the skidding tendencies and increasing the safety of the vehicle operation. A further beneficial effect in vehicles embodying my improved differential is secured in practice in starting the vehicle from rest on a slippery road, as for example, when starting from an icy gutter in winter weather, or when stopped on a slippery road waiting for traffic to move. Under such circumstances, in vehicles embodying my improved differential mechanism the leverage variation produced in the gearing as the differential gears tend to rotate with relation to each other due to wheel slippage, prevents loss of traction and side slipping of the vehicle, and ample traction is found to exist in practice to move the vehicle under adverse conditions. Furthermore, on a slippery road while waiting for traffic to start, the clutch of a vehicle embodying my invention may be engaged suddenly without the tendency of the vehicle to sideslip. Such tendency is present with vehicles under similar conditions embodying the usual differentials.

My improved differential mechanism is highly useful for dividing power in compensating drives for multi-wheel road vehicles and when so utilized prevents the complete loss of traction on all wheels of a tandem pair of driven axles that occurs in the usual compensated differential type of dual axle multi-wheel road vehicle drives when one of the wheels loses its driving grip.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A differential mechanism comprising a rotatable housing; a pair of bevel side gears journaled for rotation in said housing; and a number of bevel pinions rotatable with said housing and with relation to said side gears disposed in like manner between said side gears, said side gears having a number of teeth divisible by the number of pinions and said pinions each having an odd number of teeth; the teeth of said pinions and said gears being shaped to contact at points which shift alternately along substantial sections of the tooth profiles so that, as said pinions rotate with relation to said side gears, periodic and alternate variations in the power applied to said side gears occur.

2. A differential mechanism comprising a casing, a pair of side bevel gears journaled in said casing, at least one pinion carried by said casing and disposed in mesh between said side gears, the teeth of said gears and pinion having curves of action formed of circular arcs between their inner and outer pitch circles with radii substantially equal to the main back cone pitch radii to thereby afford variable leverage upon rotation of a gear with respect to the pinion, and the number of teeth on the pinion being such that the crown of each pinion tooth is diametrically opposite a root of the pinion teeth.

3. A differential mechanism comprising a casing, a pair of side gears journaled in said casing, a plurality of pinions disposed between said side gears in equally spaced relation and carried by said casing, said gears and pinions having variable leverage teeth and the number of teeth of each side gear being divisible by the number of pinions, each pinion having an odd number of teeth, and the pinions being so related to the side gears that certain crowns of teeth of the pinions simultaneously engage roots of the teeth of one of said side gears during differentiation.

CHARLES C. DAVIS.